United States Patent Office

2,716,119
Patented Aug. 23, 1955

2,716,119

PROCESS OF MAKING 2-METHYL-5-VINYL PYRIDINE

Francis E. Cislak, Indianapolis, Ind., assignor to Reilly Tar & Chemical Corporation, Indianapolis, Ind., a corporation of Indiana No Drawing. Application July 18, 1950,
Serial No. 174,584

1 Claim. (Cl. 260—290)

My present invention relates to 2-methyl-5-vinylpyridine and to the process of preparing it from 2-methyl-5-ethylpyridine.

In my application for patent Serial No. 514,970, filed December 20, 1943, now abandoned, I describe and claim broadly the process of producing vinylpyridines by the vapor phase dehydrogenation of the corresponding ethylpyridines; I also describe and claim specifically the process of producing 2-vinylpyridine by the dehydrogenation of 2-ethyl-pyridine, and the process of producing 4-vinyl-pyridine by the dehydrogenation of 4-ethylpyridine.

The subject matter of the present invention was the basis of an application Serial No. 580,494, filed March 1, 1945, now also abandoned, which was a continuation-in-part of said application Serial No. 514,970.

According to this present invention 2-methyl-5-vinyl-pyridine is produced by the vapor-phase dehydrogenation of 2-methyl-5-ethylpyridine; preferably in continuous process, although that is not necessary.

In carrying out my process I pass the vapor of the 2-methyl-5-ethylpyridine—preferably mixed with an inert gas, such as carbon dioxide or nitrogen, although that is not necessary—through a suitable reaction vessel, while maintaining dehydrogenation temperatures.

A suitable reaction vessel is a stainless steel tube. The tube may, if desired, be packed with a contact mass, but that is not necessary; the contact mass may be small granules of silica or the like, desirably between sand-grain size and pea size, and if desired may be coated or impregnated with a dehydrogenation catalyst.

Among the dehydrogenation catalysts which are effective are the oxides of the metals of the groups IV, V, and VI of the periodic system, either singly or mixed with one another. The catalytic effect of these oxides may be varied by the addition of other oxides, such, for instance, as an oxide of manganese, iron, cobalt, or nickel.

Because it makes it easier to control the reaction, I prefer to mix the 2-methyl-5-ethylpyridine with an inert gas, such as carbon dioxide, nitrogen, or flue gas, before passing it in vapor phase through the reaction tube. I need not, however, mix the vapors with an inert gas; for the 2-methyl-5-ethylpyridine may be mixed with air, or it need not be mixed with anything.

The dehydrogenation temperature is an elevated one, in comparison with room temperature, and is preferably in the range of 500° C. to 800° C., and desirably about 700° C.

I have found one excellent dehydrogenation catalyst to be a tungstic oxide catalyst prepared as follows:

Thirty grams of 85% tungstic acid (C. P.) is dissolved in 250 cc. of hot 6% aqueous ammonium hydroxide. This hot solution is sprayed onto 250 cc. of small granules of silica, desirably between sand-grain size and pea size, which are heated well above 100° C., thus coating the granules. After the spraying, the coated granules are calcined in air at about 400° C.–500° C. for several hours.

I have found another excellent catalyst to be a vanadium pentoxide catalyst prepared as follows:

A hot aqueous suspension of ammonium vanadate is sprayed onto small granules of silica, desirably between sand-grain size and pea size, which are heated well above 100° C. After the spraying, the coated granules are calcined in air at about 400° C. for several hours.

A ceric oxide catalyst prepared as follows was also found to be an excellent catalyst:

Twenty grams of ceric sulfate (anhydrous) is dissolved in 150 cc. of hot water. This hot solution is sprayed onto 100 cc. of small granules of silica, desirably between sand-grain size and pea size, which are heated well above 100° C., thus coating the granules. After the spraying, the coated granules are calcined in air at about 400° C.–500° C. for several hours.

The coated and calcined granules, of any of these materials, are placed in steel tubes in which the dehydrogenation reactions are to take place.

*Example I*

I vaporize 2-methyl-5-ethylpyridine, mix it with about an equal volume of carbon dioxide or nitrogen, and heat (either before or after the mixing) to about 500° C. This hot mixture of 2-methyl-5-ethylpyridine and carbon dioxide or nitrogen is passed through a stainless steel tube containing crushed silica brick, desirably between sand-grain size and pea size, at a space velocity of about 100–500, with the tube and the mixture of gases maintained at about 700° C. in any suitable manner. (By space velocity I mean the total volume of gas, measured at standard temperature and pressure, which passes through the tube per hour, divided by the volume of the catalyst.) Dehydrogenation occurs as the mixture of 2-methyl-5-ethylpyridine and carbon dioxide passes over the silica brick, to convert the 2-methyl-5-ethylpyridine to 2-methyl-5-vinylpyridine. The vapors of 2-methyl-5-vinylpyridine and any unchanged 2-methyl-5-ethylpyridine are condensed. The condensate thus obtained contains from 25% to 40% of 2-methyl-5-vinylpyridine. The 2-methyl-5-vinylpyridine may be separated from the unchanged 2-methyl-5-ethylpyridine in any suitable manner, as by fractional distillation, and the unchanged 2-methyl-5-ethylpyridine may then be reused to produce more 2-methyl-5-vinylpyridine.

*Example II*

The procedure of Example I is repeated save that in place of the silica brick I use the ceric oxide catalyst described above.

*Example III*

The procedure of Example I is repeated save that in place of the ceric oxide catalyst I use a tungstic oxide catalyst prepared as described above.

*Example IV*

I vaporize 2-methyl-5-ethylpyridine, mix it with about an equal volume of carbon dioxide or nitrogen and heat (either before or after the mixing) to about 500° C. This hot mixture of 2-methyl-5-ethylpyridine and carbon dioxide or nitrogen is passed through an empty stainless-steel or steel tube at a space velocity of about 100–200, with the tube and the mixture of gases maintained at about 700° C. in any suitable manner. (In this example by space velocity I mean the total volume of gas, measured at standard temperature and pressure, which passes through the tube per hour, divided by the volume of the tube.) As the mixture of gases passes through the tube, the 2-methyl-5-ethylpyridine is dehydrogenated to produce 2-methyl-5-vinylpyridine. The 2-methyl-5-vinylpyridine and any unchanged 2-methyl-5-ethylpyridine are separated in any convenient manner.

The 2-methyl-5-vinylpyridine is a liquid boiling at about 92° C. at a pressure of 45 mm. of mercury; it has an index of refraction at 20° C. of about 1.5415. Heating causes it to polymerize to a resinous mass. It will copolymerize with butadiene to give a synthetic elastomer.

I claim:

A process for producing 2-methyl-5-vinylpyridine which comprises passing vapors of 2-methyl-5-ethylpyridine over a solid dehydrogenation catalyst at a temperature of about 700° C. and not substantially exceeding 800° C. to produce 2-methyl-5-vinylpyridine and recovering the 2-methyl-5-vinylpyridine thus produced.

No references cited.